(12) United States Patent
Wang et al.

(10) Patent No.: US 12,703,580 B2
(45) Date of Patent: Aug. 11, 2026

(54) PROCESSING AND BUFFERING DEVICE

(71) Applicant: Delta Electronics, Inc., Taoyuan City (TW)

(72) Inventors: Cheng Wang, Shanghai (CN); Yi Li, Shanghai (CN); Yuqin Tang, Shanghai (CN); Qi Wei, Shanghai (CN); Chao Lu, Shanghai (CN); Ruiting Xiong, Shanghai (CN)

(73) Assignee: Delta Electronics, Inc., Taoyuan City (TW)

( * ) Notice: Subject to any disclaimer, the term of this patent is extended or adjusted under 35 U.S.C. 154(b) by 904 days.

(21) Appl. No.: 17/970,236

(22) Filed: Oct. 20, 2022

(65) Prior Publication Data

US 2023/0129739 A1 Apr. 27, 2023

(30) Foreign Application Priority Data

Oct. 25, 2021 (CN) ......................... 202111243203.X

(51) Int. Cl.
*B65G 47/82* (2006.01)
*B65G 47/26* (2006.01)

(52) U.S. Cl.
CPC ............. *B65G 47/82* (2013.01); *B65G 47/26* (2013.01)

(58) Field of Classification Search
CPC .... B65G 47/82; B65G 47/26; B65G 47/5104; G01G 19/52
See application file for complete search history.

(56) References Cited

U.S. PATENT DOCUMENTS 8,145,350 B2 * 3/2012 Lancaster, III ........ B65G 61/00 414/791.8
2002/0079022 A1 * 6/2002 Colle ...................... B27C 7/005 144/382

(Continued)

FOREIGN PATENT DOCUMENTS

CN 103803301 A 5/2014
CN 206375362 U 8/2017

(Continued)

OTHER PUBLICATIONS

Zhou Jiping and Lin Gang. Mechanical Manufacturing Automation Technology. Planned Textbook for Mechanical and Electrical Engineering for General Higher Education. Sep. 30, 2001. p. 82-83.

*Primary Examiner* — Michael Collins
(74) *Attorney, Agent, or Firm* — KIRTON McCONKIE; Evan R. Witt

(57) ABSTRACT

A processing and buffering device compatible with various conveying lines is disclosed and includes a fixing and installation mechanism, a jacking component and a clamping component. The fixing and installation mechanism is used for fixing the processing and buffering device on a lateral side of a conveying line. The jacking component is disposed on the fixing and installation mechanism, and includes a jacking cylinder and a connection element, wherein the jacking component is allowed moving up and down in a vertical direction under the action of the jacking cylinder. The clamping component is disposed on the fixing and installation mechanism, connected to the jacking component through the connection element, and includes a horizontal displacement cylinder and two clamping elements. The clamping component is driven by the jacking component to move. The clamping elements are driven by a (Continued)

horizontal displacement cylinder to perform a clamping operation or a releasing operation.

14 Claims, 6 Drawing Sheets

(56) References Cited

U.S. PATENT DOCUMENTS

| | | | | |
|---|---|---|---|---|
| 2015/0314455 | A1* | 11/2015 | Morency | B65G 63/002 414/800 |
| 2019/0152634 | A1* | 5/2019 | Almogy | B65G 1/1376 |
| 2020/0331707 | A1* | 10/2020 | Zhang | B65G 47/901 |
| 2021/0292110 | A1* | 9/2021 | Wang | B65G 47/086 |
| 2024/0081385 | A1* | 3/2024 | Kwak | A23L 19/05 |

FOREIGN PATENT DOCUMENTS

| | | | | |
|---|---|---|---|---|
| CN | 207326381 | U | | 5/2018 |
| CN | 108438882 | A | | 8/2018 |
| CN | 110421582 | A | | 11/2019 |
| CN | 112345914 | A | | 2/2021 |
| CN | 112403917 | A | | 2/2021 |
| CN | 212952910 | U | | 4/2021 |
| CN | 213531297 | U | * | 6/2021 |
| CN | 216189110 | U | | 4/2022 |
| WO | 2012143130 | A1 | | 10/2012 |

* cited by examiner

PROCESSING AND BUFFERING DEVICE

CROSS-REFERENCE TO RELATED APPLICATION

This application claims priority to China Patent Application No. 202111243203.X, filed on Oct. 25, 2021. The entire contents of the above-mentioned patent applications are incorporated herein by reference for all purposes.

FIELD OF THE INVENTION

The present disclosure relates to a processing and buffering device, and more particularly to a processing and buffering device that is compatible with various conveying lines, and capable of realizing the operation controls of clamping and jacking the carriers on the conveying line.

BACKGROUND OF THE INVENTION

With the developing of industrial automation, more and more automated conveying lines are used in production lines in the electronics manufacturing industry for reducing the ineffective movement of personnel in the production process and improving the product production efficiency.

Due to the wide variety of electronic products, different manufacturing processes, and various product sizes and appearances, the conveying line must not only be able to adapt to the changes in the manufacturing processes, but also be compatible with the production requirements of different types of products as much as possible. Generally, the conventional conveying line is customized with a specific width dimension according to the requirements. The width dimension is matched with the corresponding carrier, and the product is placed on the carrier. In this way, it can meet the production requirements of different types of products to a certain extent. However, it is still unable to cope with the changes in demand when the product processes are adjusted. On the other hand, although the mechanical arm is used to adjust the functions of reclaiming and discharging according to the changes of the processes, the cost is relatively high.

SUMMARY OF THE INVENTION

An object of the present disclosure is to provide a processing and buffering device. It is low cost, compatible with a conveying line, and capable of realizing the operation controls of clamping and jacking the carriers on the conveying line. The processing and buffering device is designed as a modular structure, installed on one side of the conveying line, capable of clamping the carrier on the conveying line from one side of the conveying line, and compatible with various conveying lines of different widths. The modular structure of the processing and buffering device is convenient for installation and disassembly. Moreover, it allows the processing and buffering device being connected with the control system of the conveying line through the "bus", so that the processing and buffering device may be unified and controlled with the conveying line by an upper control system thereof. In addition, since the processing and buffering device is arranged on one side of the conveying line, it facilitates to design the conveying path of the carrier according to the process requirements, the assembling process is simplified and the cost is reduced at the same time.

Another object of the present disclosure is to provide a processing and buffering device. Since the modular processing buffer device is expandable, it allows installing one or more processing and buffering devices on the conveying line according to the process requirements. Moreover, it facilities the upper control system to configure the device ID of the processing and buffering devices, so as to realize the coordinated use of multiple processing and buffering devices.

In accordance with an aspect of the present disclosure, a processing and buffering device is provided and includes a fixing and installation mechanism, a jacking component and a clamping component. The fixing and installation mechanism is used for fixing the processing and buffering device on a lateral side of a conveying line. The jacking component is disposed on the fixing and installation mechanism, and includes a jacking cylinder and a connection element, wherein the jacking component is allowed moving up and down in a vertical direction under the action of the jacking cylinder. The clamping component is disposed on the fixing and installation mechanism, and connected to the jacking component through the connection element. The clamping component includes a horizontal displacement cylinder and a pair of clamping elements. The clamping component is driven by the jacking component to move relative to the fixing and installation mechanism to an ascending critical position or a descending critical position. The pair of clamping elements is detachably disposed on two opposite sides of the horizontal displacement cylinder, and is driven by the horizontal displacement cylinder to perform a clamping operation or a releasing operation.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

Figure 1:
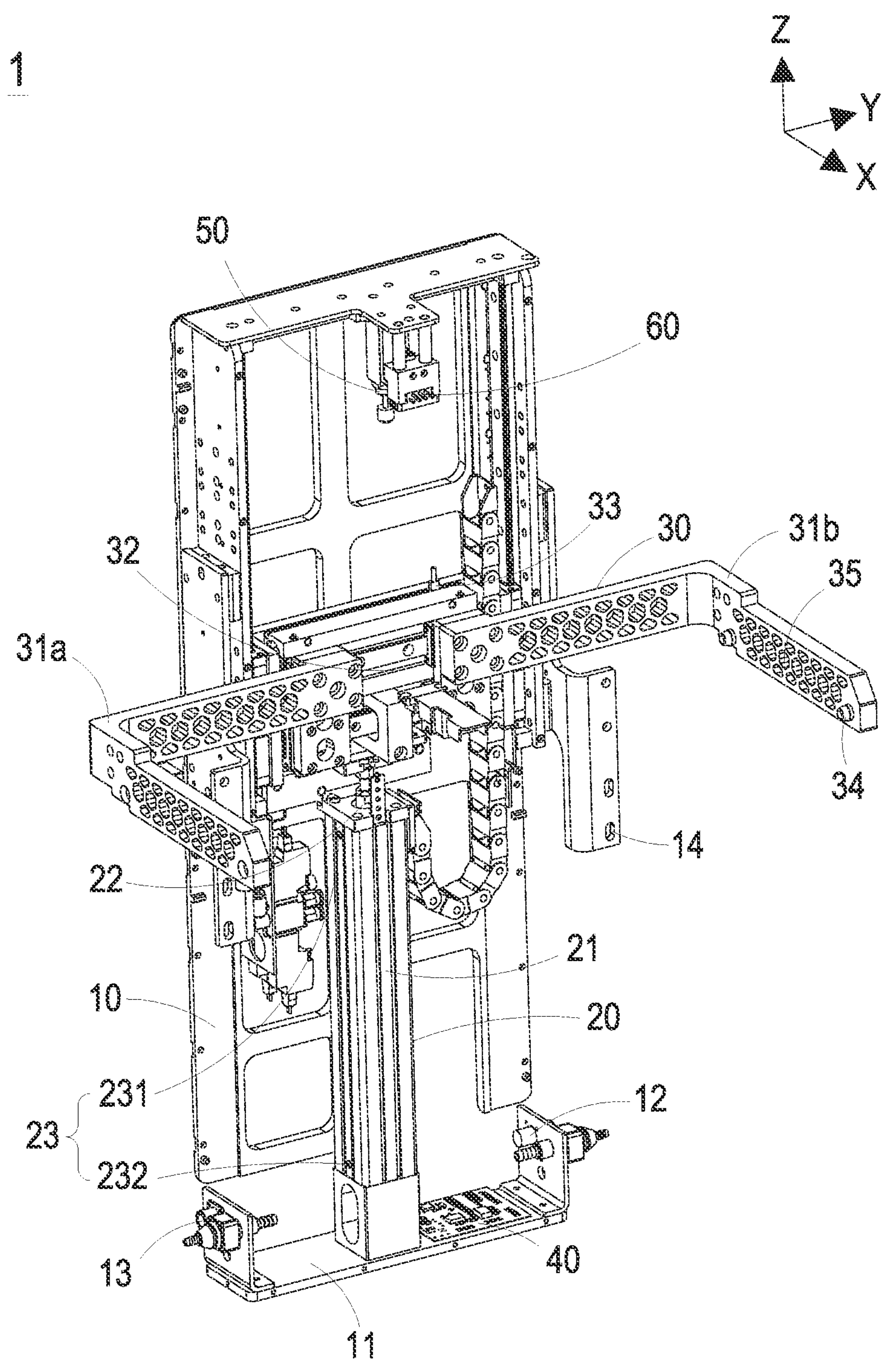
FIG. 1 is a schematic structural view illustrating a processing and buffering device according to an embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "below," "under," "lower," "over," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments. Besides, "and/or" and the like may be used herein for including any or all combinations of one or more of the associated listed items.

Figure 2:
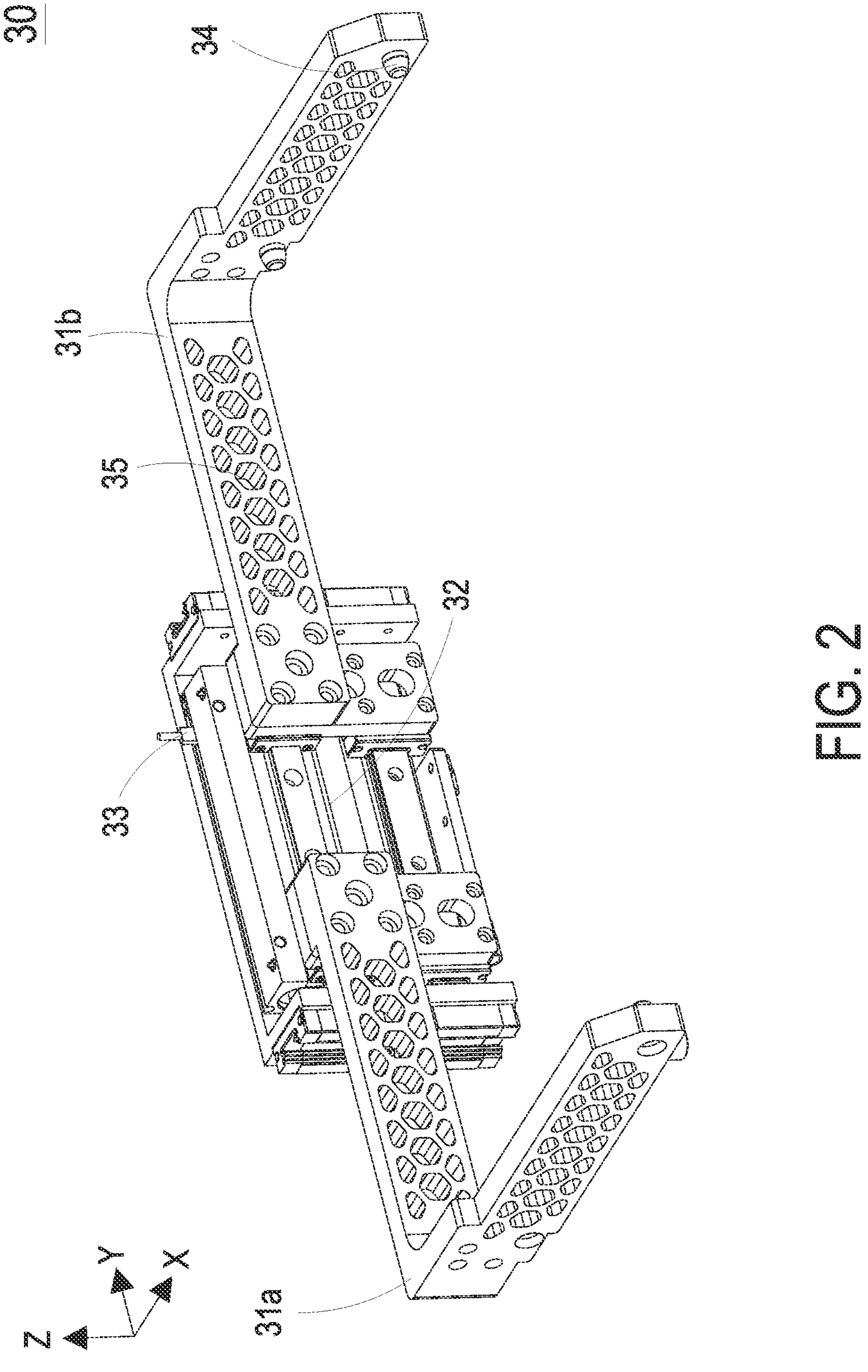
FIG. 2 is a schematic structural view illustrating the clamping component of the processing and buffering device according to the embodiment of the present disclosure.
Figure 3:
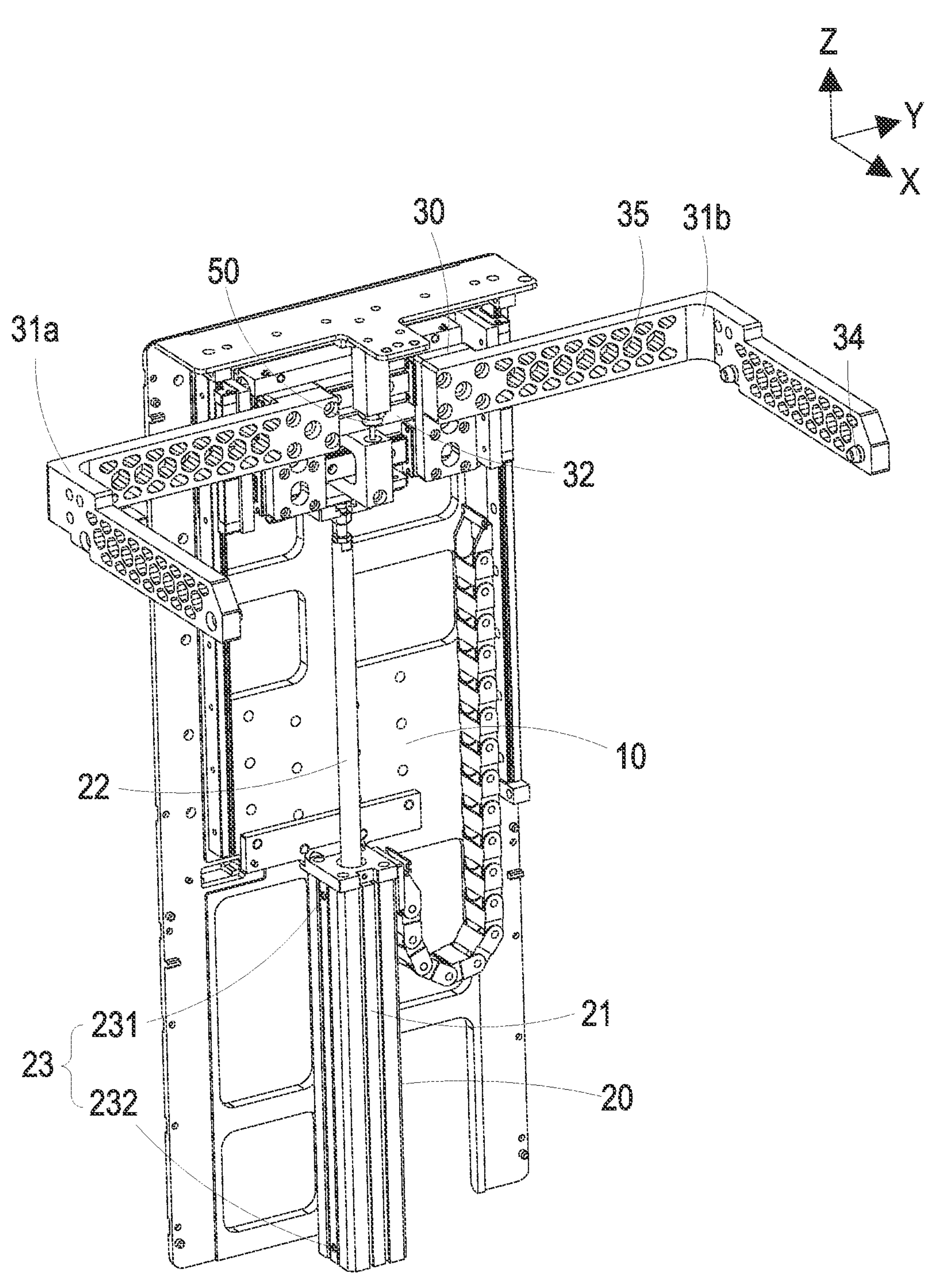
FIG. 3 is a schematic structural view illustrating the connection structure of the jacking component and the clamping component in the processing and buffering device according to the embodiment of the present disclosure.
Figure 4A:
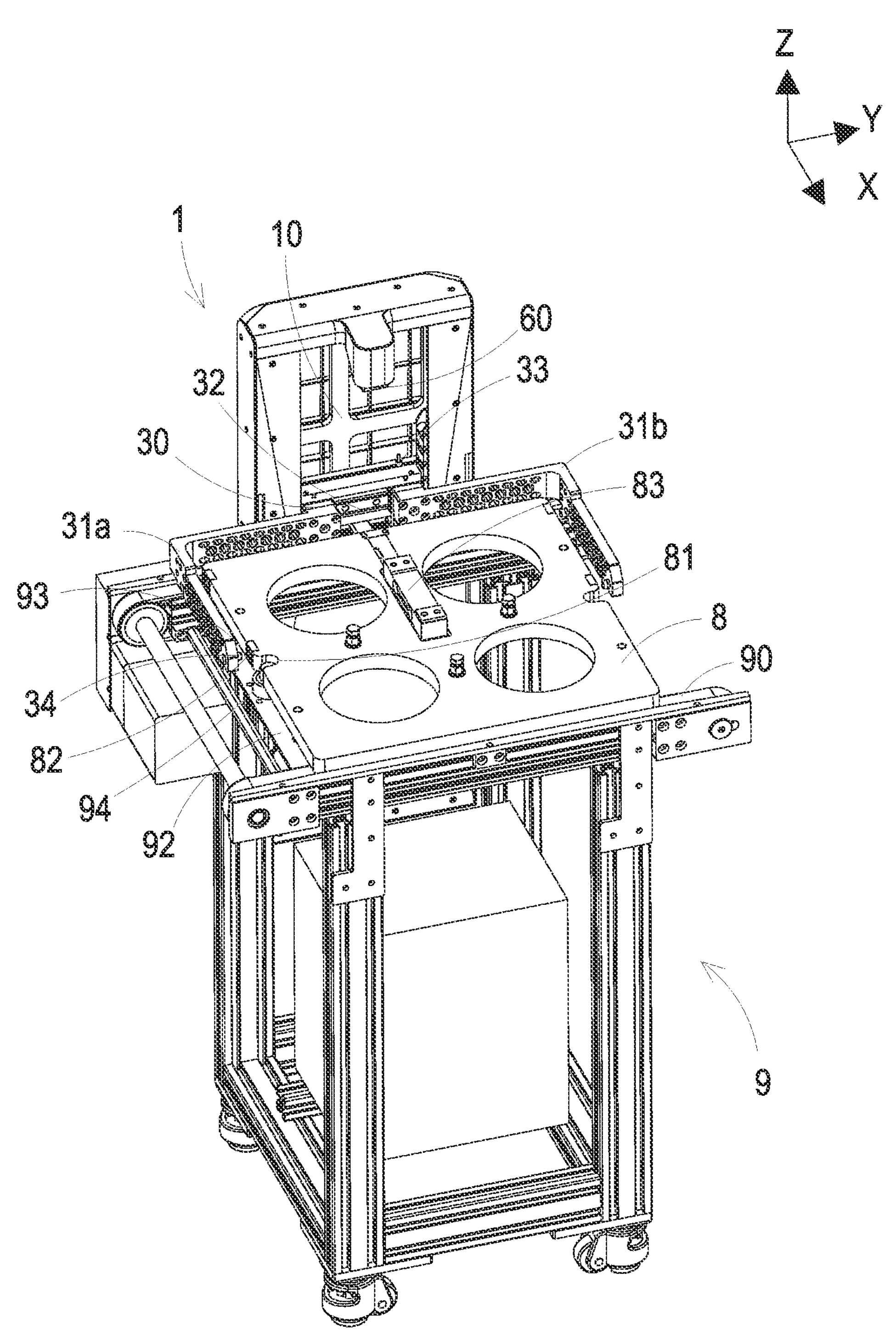
FIG. 4A schematically shows the processing and buffering device fixed on a conveying line according to the embodiment of the present disclosure.
Figure 4B:
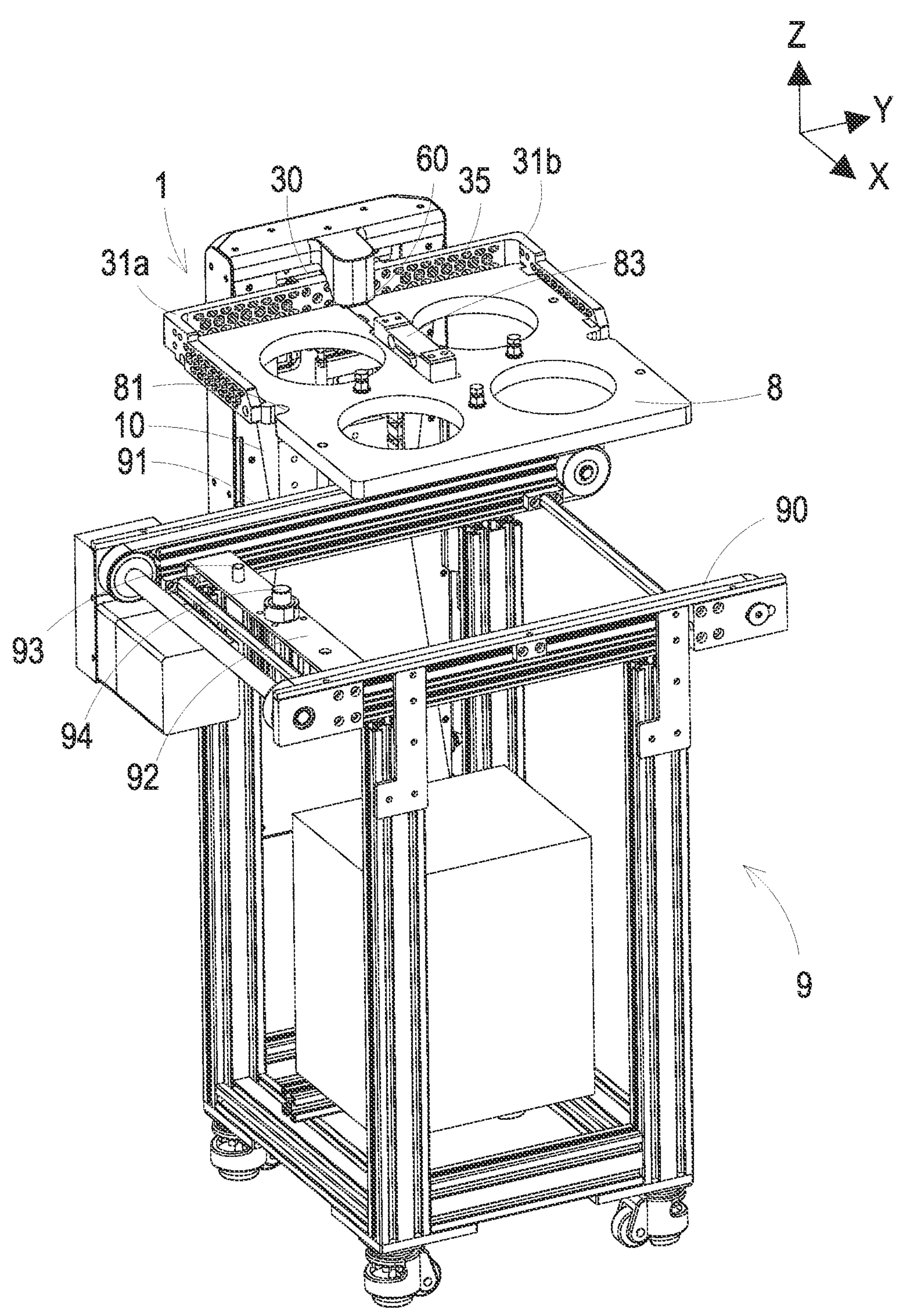
FIG. 4B schematically shows that the processing buffer device transports the carrier on the conveying line to the processing and buffering position according to the embodiment of the present disclosure.

FIG. 1 is a schematic structural view illustrating a processing and buffering device according to an embodiment of the present disclosure. FIG. 2 is a schematic structural view illustrating the clamping component of the processing and buffering device according to the embodiment of the present disclosure. FIG. 3 is a schematic structural view illustrating the connection structure of the jacking component and the clamping component in the processing and buffering device according to the embodiment of the present disclosure. FIG. 4A schematically shows the processing and buffering device fixed on a conveying line according to the embodiment of the present disclosure. FIG. 4B schematically shows that the processing buffer device transports the carrier on the conveying line to the processing and buffering position according to the embodiment of the present disclosure. In the embodiment, a processing and buffering device 1 at least includes a fixing and installation mechanism 10, a jacking component 20 and a clamping component 30. The fixing and installation mechanism 10 is used for fixing the processing and buffering device 1 on a lateral side 91 of a conveying line 9. In other embodiments, the processing and buffering device 1 is compatible with various conveying lines and the present disclosure is not limited thereto. In the embodiment, the jacking component 20 is disposed on the fixing and installation mechanism 10. The jacking component 20 includes a jacking cylinder 21 and a connection element 22. The jacking component 20 is allowed moving up and down in a vertical direction, such as the Z axial direction, under the action of the jacking cylinder 21. The clamping component 30 is slidable and disposed on the fixing and installation mechanism 10. The clamping component 30 includes a horizontal displacement cylinder 32 and a pair of clamping elements 31*a*, 31*b*. In the embodiment, the clamping component 30 is connected to the jacking component 20 through the connection element 22. The clamping component 30 is driven by the jacking component 20 to move relative to the fixing and installation mechanism 10 to an ascending critical position (shown as FIG. 3 or FIG. 4B) or a descending critical position (shown as FIG. 1 or FIG. 4A). In the embodiment, the pair of clamping elements 31*a*, 31*b* is detachably disposed on two opposite sides of the horizontal displacement cylinder 32, and are driven by the horizontal displacement cylinder 32 to perform a clamping operation or a releasing operation for a carrier 8 on the conveying line 9.

In the embodiment, the processing and buffering device 1 further includes a logic controller 40 electrically connected to the jacking component 20 and the clamping component 30 for controlling an output state of the jacking cylinder 21 of the jacking component 20 and an output state of the horizontal displacement cylinder 32 of the clamping component 30, respectively. In the embodiment, the jacking component 20 includes a first sensor 23 electrically connected to the logic controller 40. The first sensor 23 is used for sensing an ascending critical position or a descending critical position of the jacking component 20 and transmitting correspondingly a jacking-cylinder-in-position signal to the logic controller 40. In the embodiment, the clamping component 30 further includes a second sensor 33 electrically connected to the logic controller 40. When the clamping elements 31*a*, 31*b* are driven to perform the clamping operation or the releasing operation, the second sensor 33 is used to sense a relative horizontal distance between the pair of clamping elements 31*a*, 31*b* in the X axial direction, and an interval-distance signal is correspondingly transmitted to the logic controller 40, so that the pair of clamping element 31*a*, 31*b* is precisely controlled to perform the clamping operation or the releasing operation for the carrier 8. Notably, in the embodiment, the pair of clamping element 31*a*, 31*b* is detachably connected to the horizontal displacement cylinder 32, so that it allows disassembling or replacing the clamping elements 31*a*, 31*b* from the horizontal displacement cylinder 32. Therefore, for the carriers 8 of different lengths, it allows providing the clamping elements 31*a*, 31*b* with the corresponding lengths. In case of that, there is no change in the manufacturing process of the product but only the length of the carrier 8 for the product is different, it allows to replace the clamping elements 31*a*, 31*b* directly, so as to continue production. In the embodiment, the clamping component 30 includes a plurality of holes 35 spaced apart and disposed on the pair of clamping elements 31*a*, 31*b*. In other words, the clamping elements 31*a*, 31*b* can be designed with a honeycomb structure to reduce the weight of the clamping elements 31*a*, 31*b*.

In this embodiment, the first sensor 23 of the jacking component 20 includes a first sensing point 231 and a second sensing point 232. In the embodiment, the first sensing point 231 and the second sensing point 232 are opposite to each other and disposed on the upper end and the lower end of the jacking cylinder 21. Moreover, the first sensing point 231 and the second sensing point 232 are electrically connected to the logic controller 40. Preferably but exclusively, the first sensing point 231 of the first sensor 23 is used for sensing that the clamping component 30 is moved to the ascending critical position (as shown in FIG. 3 or FIG. 4B) when the clamping component 30 driven by the jacking component 20, and then transmitting the jacking-cylinder-in-position signal of ascending to the logic controller 40. In addition, the second sensing point 232 of the first sensor 23 is used for sensing that the clamping component 30 is moved to the descending critical position (as shown in FIG. 1 or FIG. 4A) when the clamping component 30 is driven by the jacking component 20, and then transmitting the jacking-cylinder-in-position signal of descending to the logic controller 40. In other words, when the clamping component 30 is ascended to the ascending critical position through the jacking component 20, the first sensing point 231 of the first sensor 23 detects a signal. When the clamping component 30 is descended to the descending critical position through the jacking component 20, the second sensing point 232 of the first sensor 23 detects another signal. Certainly, those skilled in the art should understand that two sensors may also be used to sense the ascending critical position and the descending critical position on the jacking component 20, respectively. The types of the sensors are adjustable according to the practical requirements, and the present disclosure is not limited thereto. In the embodiment, when the clamping component 30 is descended to the descending critical position through the jacking component 20, as shown in FIG. 4A, the pair of clamping elements 31*a*, 31*b* of the clamping component is at the same height as the carrier 8 on the conveying line 9. In that, when the clamping elements 31*a*, 31*b* perform the clamping operation, the carrier 8 is clamped thereby. On the other hand, when the clamping component 30 is ascended to the ascending critical position through the jacking component 20, as shown in FIG. 4B, the carrier 8 clamped by the clamping component 30 is jacked up to a height, and it is convenient for a robotic arm to perform corresponding processing actions, such as gluing, screw fastening, welding or visual inspection. Certainly, the processing actions are adjustable according to the practical requirements, and the present disclosure is not limited thereto. Preferably but not exclusively, in the embodiment, the connection element 22 of the jacking component 20 is a connection rod and connected between the jacking cylinder 21 and the clamping component 30, so that it allows the jacking component 20 to drive the clamping component 30 to move between the ascending critical position and the descending critical position. Certainly, other ways in which the jacking component 20 can drive the clamping component 30 are applicable to the present disclosure. The present disclosure is not limited thereto, and not redundantly described herein.

In the embodiment, the processing and buffering device 1 further includes a spring buffer 50 disposed on a top end of the fixing and installation mechanism 10 and spatially corresponding to the clamping component 30. Preferably but not exclusively, when the clamping component 30 clamps a carrier 8 and moves to the ascending critical position, as shown in FIG. 4B, the spring buffer 50 abuts the clamping component 30, so as to realize the buffering and limiting functions of the jacking cylinder 21 and prevent the clamping component 30 from shaking when the jacking cylinder 21 jacked up in position. Moreover, in the embodiment, the fixing and installation mechanism 10 includes a fixing portion 14 disposed on two opposite lateral sides of the fixing and installation mechanism 10, and used for fixing the processing and buffering device 1 on a lateral side 91 of a conveying line 9. Preferably but not exclusively, the fixing portion 14 and the lateral side 91 of the conveying line 9 are fastened by the bolts and the nuts, so that the processing and buffering device 1 is quickly installed on the designated position of the conveying line 9. Certainly, the present disclosure is not limited thereto.

In the embodiment, the second sensor 33 senses the pair of clamping elements 31*a*, 31*b* in the clamping operation or the releasing operation to generate the interval-distance signal. The first sensing point 231 of the first sensor 23 senses that the clamping component 30 is driven by the jacking component 20 and moved to the ascending critical position to generate the jacking-cylinder-in-position signal of ascending. The second sensing point 232 of the first sensor 23 senses that the clamping component 30 is driven by the jacking component 20 and moved to the descending critical position to generate the jacking-cylinder-in-position signal of descending. The interval-distance signal and the jacking-cylinder-in-position signals are transmitted to the logic controller 40. Thereby, it allows the logic controller 40 to control the output state of the horizontal displacement cylinder 32 of the clamping component 30 and the output state of the jacking cylinder 21 of the jacking component 20, respectively. In the embodiment, the processing and buffering device 1 further includes a carrying portion 11. Preferably but not exclusively, the logic controller 40 is disposed on the carrying portion 11. In addition, the carrying portion 11 is connected to a bottom end of the fixing and installation mechanism 10 or a bottom end of the jacking component 20. In other embodiments, the logic controller 40 is mounted on the inside or outside of the processing and buffering device 1. Preferably but not exclusively, the logic controller 40 and the processing and buffering device are displaced together to change the installation position on the conveying line 9. Certainly, the present disclosure is not limited thereto. In an embodiment, the logic controller 40 transmits data through a wired communication, can be for example but not limited to RS485, CAN or Internet. In another embodiment, the logic controller 40 transmits data through a wireless communication, can be for example but not limited to Wi-Fi, Lora or 5G. In the embodiment, the logic controller 40 of the processing and buffering device 1 is connected with the conveying line 9 or the controllers of other functional modules through a data communication bus, and the data communication bus and the power supply line may be implemented through a one-cable connection. In the embodiment, the processing and buffering device 1 further includes an input interface 12 and an output interface 13 disposed on two opposite sides of the carrying portion 11, respectively. In an embodiment, the processing and buffering device 1 is electrically connected to an adjacent processing and buffering device (not shown) through the input interface 12 or the output interface 13. In the embodiment, the input interface 12 and the output interface 13 are one-cable connectors. Preferably but not exclusively, the input interface 12 is used as an input port of a power line and a data communication, and the output interface 13 is used as an output port for connecting other modules. An upper control system of the processing and buffering device 1 and the conveying line 9 is allowed to set a transportation state of the carrier 8 according to the production process state of the carrier 8, such as in position of buffering, or the processing completion. When a transportation instruction from the upper control system is received by the logic controller 40, it allows to perform a specific function. Preferably but not exclusively, when the transportation instruction for keeping the carrier 8 in position buffering is received, the logic controller 40 of the processing and buffering device 1 controls the jacking component 20 and the clamping component 30 is ascended after the clamping component 30 performs the clamping operation for the carrier 8, so that the carrier 8 clamped by the clamping component 30 is ascended to the ascending critical position.

When the transportation instruction for the processing completion is received, the clamping component 30 is driven and moved to the descending critical position by the jacking component 20. After the clamping component 30 performs the releasing operation to release the carrier 8, the clamping component 30 is ascended to the ascending critical position by the jacking component 30 again.

In the embodiment, the conveying line 9 includes a pair of conveying belts 90, a carrier sensor 93, a blocking-cylinder component 94 and a fixing element 92. Preferably but not exclusively, the pair of conveying belts 90 is parallel to the lateral side of the conveying line 9 and used for carrying and transporting the carrier 8. In the embodiment, the fixing element 92 is arranged on a path of the conveying line 9 to transport the carrier 8, and the carrier sensor 93 and the blocking-cylinder component 94 are respectively arranged on the fixing element 92. Preferably but not exclusively, the fixing element 92 is arranged between the pair of conveying belts 90. In the embodiment, the carrier sensor 93 is used for sensing a position of the carrier 8 relative to the processing and buffering device 1, so that when the carrier 8 is blocked by the blocking-cylinder component 94, the carrier 8 is positioned between the pair of clamping elements 31*a*, 31*b*. In order to position the carrier 8 between the clamping elements 31*a*, 31*b* accurately, in the embodiment, the carrier 8 includes a positioning groove 81 is disposed on a periphery of the carrier 8 and spatially corresponding to the blocking-cylinder component 94. When the blocking-cylinder component 94 is engaged with the positioning groove 81, the carrier 8 is accurately positioned between the pair of clamping elements 31*a*, 31*b*. In the embodiment, the signal receiving of the carrier sensor 93 and the control of the blocking-cylinder component 94 are implemented by a controller of the conveying line 9, or by the logic controller 40 of the processing and buffering device 1. The present disclosure is not limited thereto. In the embodiment, the clamping component 30 further includes a pair of protrusions 34 disposed on the pair of clamping elements 30, respectively. Moreover, the carrier 8 includes a pair of recesses 82 disposed on two opposite sides of the carrier 8 and spatially corresponding to the protrusions 34 of the clamping component 30. When the clamping component 30 performs the clamping operation for the carrier 8, the protrusions 34 and the recesses 84 are engaged with each other, so that the carrier 8 is stably clamped by the pair of clamping elements 31*a*, 31*b*. Certainly, the present disclosure is not limited thereto.

Preferably but not exclusively, in the embodiment, the carrier 8 includes an RFID (not shown), and the logic controller 40 further includes an RFID reader (not shown) for reading the RFID of the carrier 8. Preferably but not exclusively, in the embodiment, the carrier 8 is a scale tray and includes a load cell 83. The processing and buffering device 1 further includes a data port 60 disposed on the top end of the fixing and installation mechanism 10, electrically connected to the logic controller 40, and spatially corresponding to the clamping component 30. In the embodiment, when the carrier 8 is clamped by the clamping component 30 and moved to the ascending critical position, the logic controller 40 reads a carrier-weight datum from the load cell 83 through the data port 60, and further feeds back the carrier-weight datum to the upper control system. Certainly, the present disclosure is not limited thereto.

Figure 5:
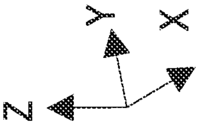
FIG. 5 schematically shows a layout of a plurality of processing and buffering positions formed by the processing and buffering devices according to the embodiment of the present disclosure.
Figure 5:
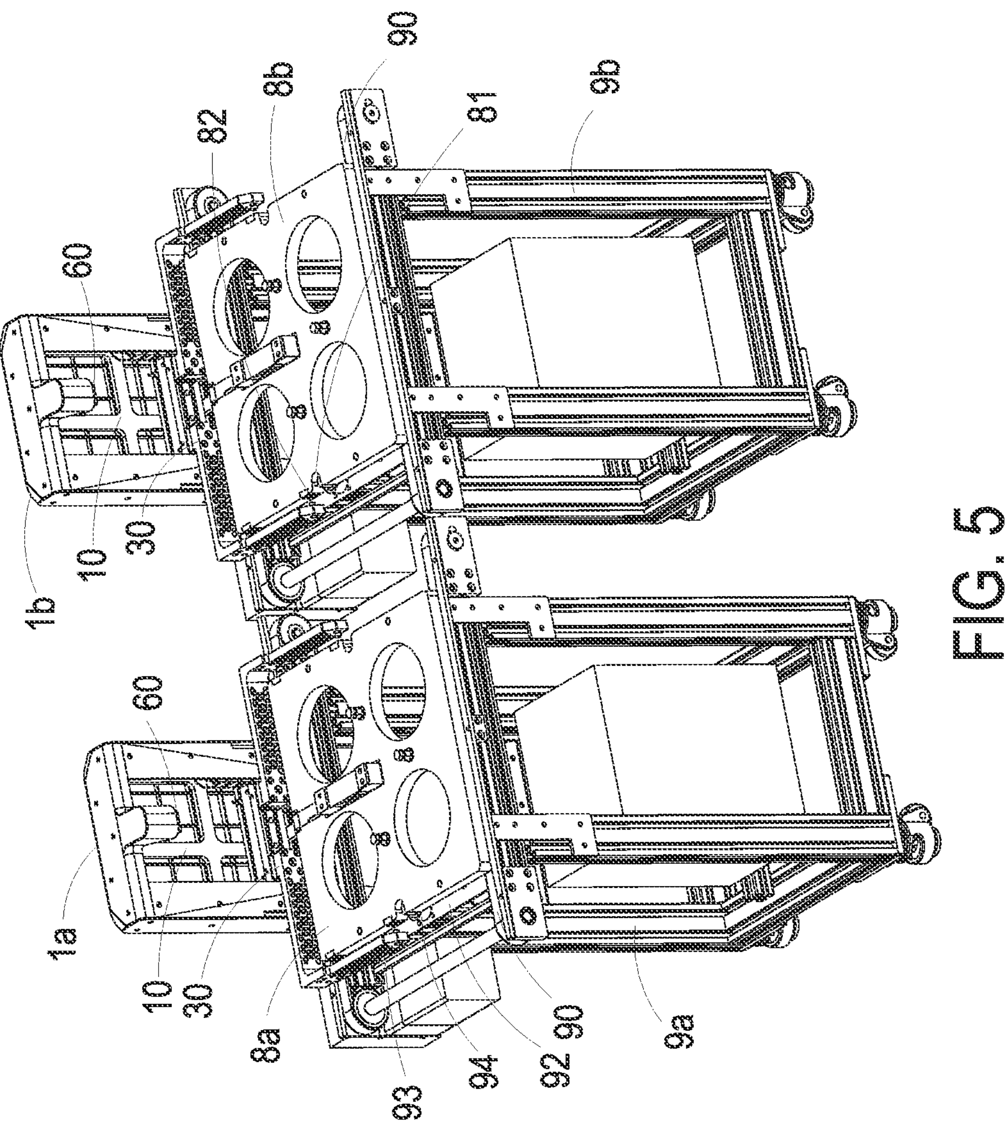

FIG. 5 schematically shows a layout of a plurality of processing and buffering positions formed by the processing and buffering devices according to the embodiment of the present disclosure. In the embodiment, two processing and buffering devices 1*a*, 1*b* are respectively installed on the conveying lines 9*a*, 9*b* connected in series. Preferably but not exclusively, the processing and buffering devices 1*a*, 1*b* are cooperated with the carriers 8*a*, 8*b* on the conveying lines 9*a*, 9*b* to perform a specific processing action, such as gluing, screw fastening, welding or visual inspection. In case of that the production process needs to be modified, for example, the processing and buffering devices 1*a*, 1*b* are added on the conveying lines 9*a*, 9*b* connected in series to perform a gluing operation after a screw-fastening operation is completed. Preferably but not exclusively, the processing and buffering device 1*a* is cooperated to perform the screw-fastening operation, and the processing and the buffering device 1*b* is cooperated with the gluing operation. Therefore, in the production line, when the processing and buffering device 1*b* is cooperated with the carrier 8*b* to perform the gluing operation, the processing and buffering device 1*a* is cooperated with the carrier 8*a* to perform the screw-fastening operation at the same time. In other embodiments, in case of that a processing action such as a welding operation needs to be added in the production line, it allows to add a processing and buffering device installed on the linear conveying module directly, and equipped with related equipment for performing the welding operation, so as to achieve the adjustment of the production line layout quickly. In the embodiment, the processing and buffering device 1*a* is installed on the lateral side of the conveying line 9*a*, the processing and buffering device 1*b* is installed on the lateral side of the conveying line 9*b*, and the two conveying lines 9*a*, 9*b* are connected in series to form the production line. The carriers 8*a*, 8*b* are used and transported on the conveying lines 9*a*, 9*b*. In the embodiment, the processing and buffering device 1*b* is cooperated with the relevant gluing equipment after the carrier 8*b* is clamped and ascended in position. Preferably but not exclusively, in other embodiments, each of the carriers 8*a*, 8*b* is a scale tray, and the weight change of the glue due to the gluing operation can be fed back in real time. In other embodiments, the upper control system is allowed to configure the device IDs of the processing and buffering devices 1*a*, 1*b*, so as to realize the coordinated use of multiple processing and buffering devices. For example, the processing and buffering device 1*a* is configured as No. 1, and the processing and buffering device 1*b* is configured as No. 2. In an embodiment, in case of that the processing and buffering device 1*b* takes a long time to perform the gluing operation of the carrier 8*b* during the production process, and the equipment cooperated with the processing and buffering device 1*a* and completing the screw-fastening operation of the carrier 8*a* is idle for a long time, it allows to directly add a new processing and buffering device on the lateral side of the conveying line module for performing the gluing operation, to adjust the efficiency of the production line.

As can be seen from the above, the modular processing and buffering devices 1, 1*a*, 1*b* are installed on the conveying lines 9, 9*a*, 9*b* for processing and buffering in a wide range of applications. According to the needs of different production lines, the processing and buffering devices 1, 1*a*, 1*b* can be installed on the conveyor lines 9, 9*a*, 9*b* arbitrarily or omitted. Certainly, the processing and buffering devices 1, 1*a*, 1*b* and the conveying lines 9, 9*a*, 9*b* in the present disclosure can be combined to change the aforementioned technical features according to the practical requirements. The present disclosure is not limited thereto, and not redundantly described herein.

In summary, the present disclosure provides a processing and buffering device. It is low cost, compatible with a conveying line, and capable of realizing the operation controls of clamping and jacking the carriers on the conveying line. The processing and buffering device is designed as a modular structure, installed on one side of the conveying line, capable of clamping the carrier on the conveying line from one side of the conveying line, and compatible with various conveying lines of different widths. The modular structure of the processing and buffering device is convenient for installation and disassembly. Moreover, it allows the processing and buffering device being connected with the control system of the conveying line through the bus, so that the processing and buffering device is unified and controlled with the conveying line by an upper control system thereof. In addition, since the processing and buffering device is arranged on one side of the conveying line, it facilitates to design the conveying path of the carrier according to the process requirements, the assembling process is simplified and the cost is reduced at the same time. Furthermore, since the modular processing buffer device is expandable, it allows installing one or more processing and buffering devices on the conveying line according to the process requirements. Moreover, it facilities the upper control system to configure the device ID of the processing and buffering devices, so as to realize the coordinated use of multiple processing and buffering devices.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A processing and buffering device, comprising:

a fixing and installation mechanism;

a jacking component disposed on the fixing and installation mechanism, and comprising a jacking cylinder and a connection element, wherein the jacking component is allowed moving up and down in a vertical direction under the action of the jacking cylinder;

a clamping component disposed on the fixing and installation mechanism, connected to the jacking component through the connection element, and comprising a horizontal displacement cylinder and a pair of clamping elements, a carrying portion connected to a bottom end of the fixing and installation mechanism, and a logic controller disposed on the carrying portion and electrically connected to the lacking component and the clamping component for controlling an output state of the lacking cylinder and an output state of the horizontal displacement cylinder, respectively, wherein the processing and buffering device is a modular structure, installed on one side of a conveying line by the fixing and installation mechanism, and compatible with various conveying lines of different widths, wherein the clamping component is driven by the jacking component to move relative to the fixing and installation mechanism to an ascending critical position or a descending critical position, wherein the pair of clamping elements is detachably disposed on two opposite sides of the horizontal displacement cylinder, and are driven by the horizontal displacement cylinder to move above the conveying line to perform a clamping operation or a releasing operation.

2. The processing and buffering device according to claim 1, wherein the jacking component further comprises a first sensor electrically connected to the logic controller, wherein the first sensor is used for sensing an ascending critical position or a descending critical position of the jacking component and transmitting correspondingly a jacking-cylinder-in-position signal to the logic controller.

3. The processing and buffering device according to claim 1, wherein the clamping component further comprises a second sensor electrically connected to the logic controller, wherein the second sensor is used to sense a relative horizontal distance between the pair of clamping elements when the clamping operation or the releasing operation is performed, and correspondingly transmit an interval-distance signal to the logic controller.

4. The processing and buffering device according to claim 1, wherein when the clamping component is driven by the jacking component to move to the descending critical position, the pair of clamping elements is driven by the horizontal displacement cylinder to perform the clamping operation or the releasing operation for a carrier on the conveying line.

5. The processing and buffering device according to claim 4, wherein the conveying line comprises a carrier sensor, a blocking-cylinder component and a fixing element, the fixing element is arranged on a path of the conveying line to transport the carrier, the carrier sensor and the blocking-cylinder component are respectively arranged on the fixing element, and the carrier sensor is used for sensing a position of the carrier relative to the processing and buffering device so that when the carrier is blocked by the blocking-cylinder component, the carrier is positioned between the pair of clamping elements.

6. The processing and buffering device according to claim 5, wherein the conveying line comprises a pair of conveying belts, which are parallel to the lateral side of the conveying line and used for carrying and transporting the carrier, wherein the fixing element is arranged between the pair of conveying belts.

7. The processing and buffering device according to claim 5, wherein the carrier comprises a positioning groove disposed on a periphery of the carrier and spatially corresponding to the blocking-cylinder component, wherein when the blocking-cylinder component is engaged with the positioning groove, the carrier is positioned between the pair of clamping elements.

8. The processing and buffering device according to claim 4, wherein the clamping component comprises a pair of protrusions disposed on the pair of clamping elements, respectively, and the carrier comprises a pair of recesses disposed on two opposite sides of the carrier and spatially corresponding to the protrusions of the clamping component, wherein when the clamping component performs the clamping operation, the protrusions and the recesses are engaged with each other.

9. The processing and buffering device according to claim 4, wherein the carrier comprises an RFID, and the logic controller further comprises an RFID reader for reading the RFID of the carrier.

10. The processing and buffering device according to claim 4, further comprising a data port disposed on a top end of the fixing and installation mechanism, electrically connected to the logic controller, and spatially corresponding to the clamping component.

11. The processing and buffering device according to claim 10, wherein the carrier is a scale tray and comprises a load cell, wherein when the carrier is clamped by the clamping component and moved to the ascending critical position, the logic controller reads a carrier-weight datum from the load cell through the data port.

12. The processing and buffering device according to claim 1, further comprises an input interface and an output interface disposed on two opposite sides of the carrying portion, respectively, wherein the processing and buffering device is electrically connected to an adjacent processing and buffering device through the input interface or the output interface.

13. The processing and buffering device according to claim 1, wherein the clamping component comprises a plurality of holes spaced apart and disposed on the pair of clamping elements.

14. The processing and buffering device according to claim 1, further comprising a spring buffer disposed on a top end of the fixing and installation mechanism and spatially corresponding to the clamping component, wherein when the clamping component clamps a carrier and moves to the ascending critical position, the spring buffer abuts the clamping component.

* * * * *